Jan. 3, 1956   G. M. EULER ET AL   2,729,756
ELECTRICAL THERMAL MOTOR
Filed Aug. 26, 1954

Inventors:
John L. Slonneger,
George M. Euler,
by Robert G. Iruy
Their Attorney.

United States Patent Office 2,729,756
Patented Jan. 3, 1956

2,729,756
ELECTRICAL THERMAL MOTOR

George M. Euler and John L. Slonneger, Morrison, Ill., assignors to General Electric Company, a corporation of New York Application August 26, 1954, Serial No. 452,396

16 Claims. (Cl. 310—4)

This invention relates to thermal motors, and more particularly to an improved thermo-electric motor of the impulse type.

There are many applications where a slow and relatively constant timing movement is desired; one such application, for instance, is in the control of automatic washing machines, dish washers, and the like. While, of course, a conventional synchronous clock motor-driven timing device might fulfill the purpose satisfactorily, it will be recognized that such mechanisms are relatively complex and, therefore, somewhat uneconomical, especially where the function to be performed is relatively simple and the timing cycle relatively short. In such applications, it is not necessary that the movement be continuous at all times, that is, at a constant speed. Thus, the continuous accuracy of synchronous clock motor-driven mechanisms is wasted in applications where a simpler device having satisfactory accuracy over the desired period, without the continuous movement and the resultant expense, will fulfill the purpose in the precise manner desired. As a result, thermally actuated motors have been devised in order to time and control various devices. Such motors are, basically, devices in which a piece of expansible metal is alternately heated and cooled to provide motion. While the utmost simplicity is desirable in a thermal motor, it will readily be seen that the overall accuracy must be within satisfactory limits. In addition, it is desirable that the thermal motor furnish a snap action so that the engagement and disengagement of the contacts actuated thereby will be rapid. Motors furnishing such action are generally referred to as impulse-type thermal motors. Other features which have proved difficult to attain, yet which are desirable to the point of necessity, are sturdiness in the mechanism so that a long operating life is insured, and adjustability so that the calibration may be changed when so desired.

It is, therefore, an object of this invention to provide an improved thermo-electric motor of the impulse type which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broadest aspect, provides a column of material which will expand longitudinally upon an increase in its temperature. A lever is pivotably mounted to move in response to changes in the length of the column. Means are provided engaging the lever so that it will snap to a first predetermined position in response to an expansion of the column and to a second predetermined position in response to a contraction of the column. It is desirable to provide means, such as a pawl and rachet wheel, for instance for translating the lever motion into the intermittent rotary motion. The pawl may be actuated by the lever so as to cause it to cooperate with the ratchet wheel, moving it a predetermined amount when the lever snaps in one direction and returning to a ready position when the lever snaps in the other direction. Electrical contacts are preferably provided to cause the column to expand and contract alternately as long as desired. To utilize the movement thus achieved, cam means are generally provided to rotate with the ratchet wheel. One or a number of cam followers will then be controlled by the movement of the cam to effect any desired purpose such as, for instance, the closing and opening of electrical switches.

Referring now to the figures of the drawing, Figure 1 is a front view, partly in cross section and partly cut away, of the improved thermal motor of this invention viewed from the direction of arrow 84 in Figure 2;

Figure 1:
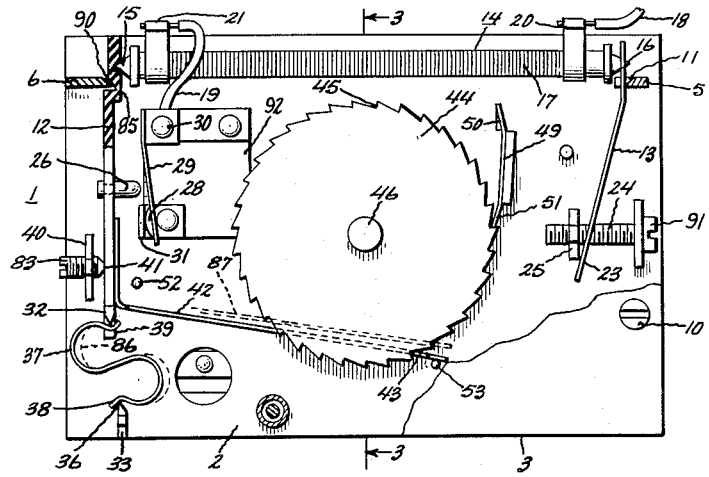
Figure 2:
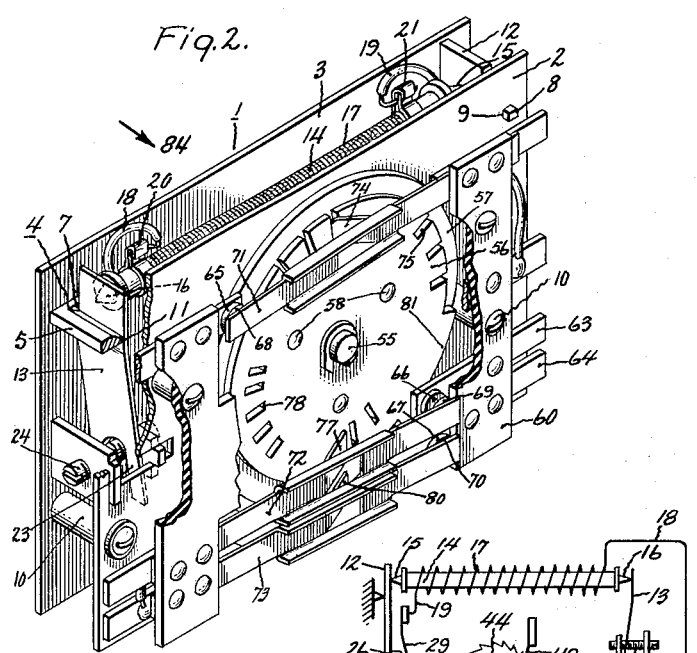
Figure 2 is a view in perspective, partly cut away, of the timer mechanism of Figure 1.
Figure 3:
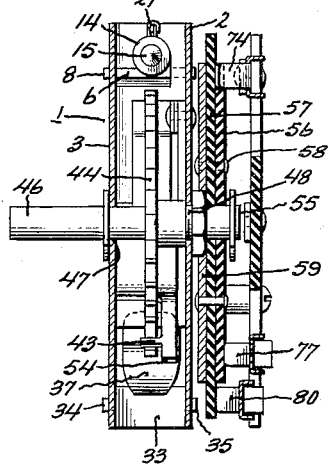
Figure 3 is a view along line 3—3 in Figure 1.

Referring now to Figures 1, 2 and 3 of the drawing, there is shown a thermal electric motor of the impulse type, generally indicated by the numeral 1. This motor is enclosed between a pair of spaced apart plate members 2 and 3. A pivot member 5 having a knife edge 11 is spaced between plate members 2 and 3, and may be held in place (as is best seen in Figures 2 and 3) by small projections such as 8 which extend through openings 9 provided in plate members 2 and 3. Since the plate members are secured together by any preferred means, such as throughbolts 10, it will be seen that the engagement of projections 8 in openings 9 will maintain the pivot member 5 securely in place as shown. A pivot member 6 is spaced between plate members 2 and 3 in a manner similar to member 5, and a lever member 12, preferably formed of some rigid material, is pivotably mounted on the knife edge 90 of pivot 6. The lever may be provided with an indentation 85 so as to provide a bearing seat for knife edge 90. A leaf spring member 13 is similarly pivotably mounted on knife edge 11 of fulcrum 5, and may also be provided with a recess (not shown) so that it will be securely maintained in position.

An expansible column 14 is supported between lever 12 and spring 13 at its ends 15 and 16 respectively. Each of ends 15 and 16 is preferably formed as a pointed cone as shown, and fitted into a corresponding recess or hole in lever 12 and spring 13 respectively. Column 14 may be formed of any material which will expand when heated; a relatively sturdy material, such as stainless steel which also has a very satisfactory coefficient of thermal expansion, is deemed preferable. It will be noted at this point that column 14 is supported exclusively by the cooperation of ends 15 and 16 with lever 12 and spring 13 respectively. Plate members 2 and 3, and column 14, are preferably formed from materials having substantially the same coefficient of expansion, so that ambient temperature changes cause all three elements to expand or contract equal amounts between pivot members 5 and 6. This results in a constant amount of energy being stored in spring 13 regardless of ambient temperature; this ensures that timing will be controlled only by the rate of energy transfer from column 14, as will be fully explained below. While this is a preferred embodiment, it will be understood that additional support may be provided if so desired.

A heating coil 17 is wound around column 14. The electric current to heat the coil may be provided by securing supply leads 18 and 19 to terminal members 20 and 21 respectively. Members 20 and 21 may be formed so as to encircle column 14 and provide the starting and finishing points of various types and thicknesses for the heating coil 17. The heat transfer rate between coil 17 and column 14 may of course be controlled by selection of the wire pitch of the coil, and by use of insulation (not shown) between the coil and the column. Spring member 13 is bifurcated at one end 23 so as to straddle a threaded member 24 having a head 91; end 23 bears against a nut 25 threaded onto member 24. It will be observed that the pressure of spring 13 against end 16 of column 14 may be varied by rotation of screw 14 which moves nut 25. This arrangement permits adjustment of the heating cycle (described below) by varying the amount of energy stored in spring 13. While any heating cycle desired may be used, it is preferred that it be as short as is practical to minimize the effect of voltage variations on cycle time.

Returning now to lever 12, insulated projection 26 is secured to the lever between the pivot point and end 27. A flexible contact arm 29 is secured to insulated base 92 by rivets 30 which are secured to plate member 2, and has a movable contact member 28 formed on its free end. Contact member 28 is arranged normally to engage a stationary contact member 31. As will be seen in Figure 4, when contact 28 engages contact 31, the circuit through heating coil 17 is completed. However, when lever 12 is moved so that projection 26 comes against contact arm 29 to force contact 28 away from contact 31, the circuit to the heating coil 17 will be opened.

At the end of lever 12 there is provided a pivot bearing surface which may be in a recess as shown at 32. A member 33 is secured between plate members 2 and 3 in any desired manner such as, for instance, by tabs 34 and 35 extending through small openings (not shown) in plate members 3 and 2 respectively. The upper surface 36 of member 33 is also arranged to form a bearing surface. An S-shaped toggle spring member 37 has one end 38 bearing against top 36 of member 33 and its other end 39 pivoted in recess 32 in lever 12. Toggle spring 37 at all times biases lever 12 in a clockwise direction. A threaded member 83 cooperates with a fixed internally threaded member 40 and bears against lever 12 at 41. Member 83 is adjusted so that lever 12 will be so positioned that it is definitely on one side of dead center of the toggle member 37. There is a definite engagement between lever 12 and column 14 due to the fact that toggle member 37 is always off dead center to the left and thus constantly exerting a force opposing the expansion of column 14. It will be observed that the fact that plate members 2 and 3 and column 14 have like coefficients of expansion permits toggle spring 37 to be unaffected by variations in the ambient temperature, as has previously been explained in connection with spring 13.

A pawl member 42 has a leg 82 securing it to lever 12. A ratchet wheel 44 having teeth 45 is secured to a shaft 46 so as to rotate therewith. Shaft 46 is rotatably mounted in openings 47 and 48 in plate members 3 and 2 respectively. Pawl member 42 has a part 43 which is arranged to engage with the teeth 45 of ratchet wheel 44. A spring member 49 is secured to housing member 2, as at 50, and has its free end 51 so shaped and in such a position as to permit ratchet wheel 44 to be rotated in a clockwise direction but so as to prevent the ratchet wheel from being rotated in a counterclockwise direction.

Referring now particularly to Figure 1, the operation of the motor as described thus far will be explained. The motor is originally in the position shown. When current is applied to heater coil 17 through contacts 28 and 31 and leads 19 and 18, the heater coil will cause column 14 to heat and therefore expand longitudinally against both spring 13 and lever 12. As the column expands lengthwise against spring 13, the spring will store up energy in an amount which is determined by the location of nut 25. At the other end of column 14, the expansion tends to cause pivoting of lever 12 about pivot member 6, thereby causing lever 12 to apply a force against the opposing force of toggle spring 37. Toggle spring 37 acts on arm 12 to give a negative spring rate to the rotary motion of the arm, i. e., the force of arm 12 progressively increases in the direction of motion. Thus, when the force built up in spring 13 due to expansion of the column exceeds the opposing force exerted by toggle spring 37 the energy stored in spring 13 will cause the spring to snap column 14 to the left (as viewed in Figure 1), in turn pivoting lever 12 and causing toggle 37 to move from its first position (shown in solid lines) to its second position (shown in dotted lines at 86) with a snap action. Stop 52 limits movement of lever 12 so that toggle member 37 never actually goes over center and thus still exerts a force against column 14. The force tending to rotate arm 12 in a clockwise direction exerted by toggle spring 37 in its second position is, however, less than that exerted by the toggle spring in its first position. Also, pawl member 42 will have moved to the position shown by the dotted lines representing it, as at 87. The snap action of lever 12 will also have caused projection 26 to move against arm 29, thereby disengaging contact 28 from contact 31 to open the circuit of coil 17 and thus stop the heating cycle. Shortly after coil 17 stops heating, column 14 will start to contract.

As it contracts, less and less energy will be stored within spring 13. Therefore, when the force exerted by toggle spring 37 and lever 12 exceeds the opposing force exerted by spring 13, it will overcome spring 13 and toggle spring 37 and lever 12 will snap back to the original position shown in solid lines. As they snap back they will, of course, take with them pawl member 42. End 43 of pawl member 42 will engage one of the ratchet teeth 45 and pull it with it to rotate ratchet wheel 44 a predetermined amount. This motion is limited both by member 83 and by a stop member 53 acting against the end 43 of pawl member 42. The snap action at end 27 of lever 12 will, of course, have caused the other end also to snap a lesser distance, and column 14 and spring 13 will also be snapped back to their original positions. End 51 of spring 49 will have permitted the clockwise motion of ratchet wheel 44 by sliding over the top of a tooth 45, and will now prevent any undesired counterclockwise motion by its engagement with the surface of the tooth. Also, projection 26 will have moved away, permitting re-engagement of contacts 31 and 28 again to start the heating cycle. It will now be seen that this cycle will repeat itself as long as desired, and that each time the heating and cooling cycle is repeated ratchet wheel 44 will be moved around a distance determined by the number of teeth 45 thereon.

Figure 4:
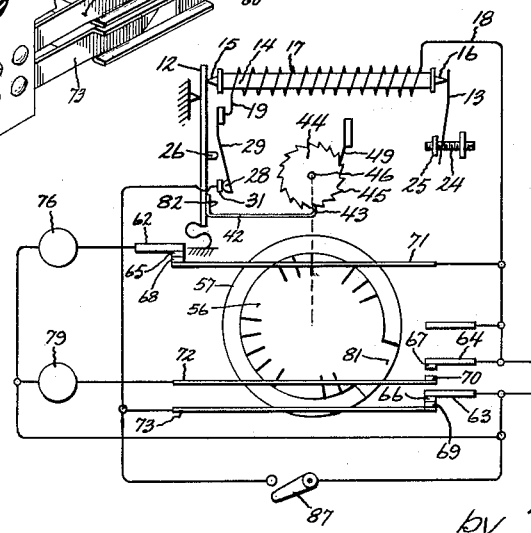
Figure 4 is a schematic diagram of a timer circuit including the improved thermal motor of this invention.

Referring now particularly to Figures 2, 3 and 4, the thermo-electric motor will be described in combination with a control device. Secured to extension 55 of shaft 46 is an assembly consisting of a cam member 56 and a somewhat larger reinforcing member 57. These may be secured together by means of members 58, and, if so desired, another strengthening disc 59 may be included in the assembly behind the cam. An insulating member 60 may be secured to and spaced from plate member 2 by means of spacer members 61 so as substantially to enclose the cam assembly. Three stationary contact arms 62, 63 and 64 are provided with stationary contacts 65, 66 and 67 respectively secured thereto. These contacts are arranged to be engageable with movable contacts 68, 69 and 70 respectively. The movable contacts are respectively secured at the ends of resilient spring arms 71, 72 and 73. Arm 71 has a depressed center portion 74 which is positioned to act as an axial cam follower in cooperation with axial cam 56. Cam 56 is provided with a group of radial slots 75 extending inwardly from the periphery of the cam. It will be seen that under normal circumstances the follower 74 will ride on the surface of cam 56 and that this action will keep contact 68 separated from contact 65. However, when cam 56 rotates into a position where follower 74 may fall into one of slots 75, the spring arm 71 will be free to cause contact 68 to engage contact 65. Referring particularly to Figure 4, it will be seen that engagement of contacts 65 and 68 will complete a circuit through a device 76, such as a relay for instance, so as to commence a specified operation.

Spring arm 72 has a similar cam follower part 77 formed therein and positioned to cooperate with radial slots 78 formed in axial cam 56. Cam follower 77 cooperates with slots 78 in cam 56 in the same manner as cam follower 74 with slots 75. Referring again to Figure 4, it will be observed that engagement of contacts 67 and 70 through the cooperation of cam follower 77 and one of slots 78 will complete the circuit through a device 79, such as a relay, which may be arranged to control a different operation.

It will be seen that spring arm 73 also has a cam follower 80 formed therein. This follower, however, is so positioned that it will cooperate only with the enlarged radius portion 81 of cam 56. A timing operation may be initiated by manually closing switch 87 to bypass contacts 66 and 69 and thus initially heat coil 17. As soon as cam follower 80 gets past enlarged portion 81, spring arm 72 will be free to bias contact 69 against contact 66 to complete the circuit through the heating coil 17. Switch 87 may then be opened and, until cam 56 rotates so that cam follower 80 is again engaged by extended section 81, the circuit through the heating coil 17 will be completely controlled by contacts 28 and 31, as previously explained. It will be apparent that, from the time cam follower 80 slips off portion 81 until cam 56 rotates almost a full revolution again to bring portion 81 against follower 80, one complete operation of the device will occur. It will be understood that the cam assembly operated by the thermal motor of Figure 1 is set forth in detail for illustrative purposes, and that the motor 1 may be used in connection with other control means to equal advantage.

It will be seen from the above description that this invention provides a thermo-electric motor of the impulse type which is simple and economical insofar as the manufacture is concerned, and endowed with sturdy parts to insure a long operating life without failure or undesired change in calibration. It will also be seen that this motor will provide a constant and reliable timing mechanism in cases where the continuous movement of a clock mechanism is unnecessary and the cost of such a mechanism would be prohibitive. It has also been shown that this motor will effect a snap action in both directions as the column expands and contracts. This snap action will provide the desired quick engagement and disengagement of contacts and will also ensure a sharp definite movement of the ratchet wheel and, consequently, of the shaft associated therewith.

While this invention has been explained by describing a particular embodiment thereof it will be apparent that improvements and modifications may be made without departing from the scope of the invention as defined in the appended claims.

What we claim as new and desire to secure by Letters Patent of the United States is:

1. A thermo-electric motor comprising support and pivot means, a lever pivotably mounted on said means, spring means mounted on said means and spaced from said lever, a column of material expansible in response to heat positioned between said spring means and said lever, means for intermittently heating said column, toggle means engaging said lever and arranged to bias said lever against said column, said spring means being arranged to overcome said toggle means at a predetermined point in the expansion of said column thereby to snap said lever to a predetermined position, said toggle means being arranged to overcome said spring means at a predetermined point in the contraction of said column thereby to snap said lever to a second predetermined position.

2. A thermo-electric motor comprising a column of material expansible and contractable in response to variations in the temperature of said material, means for intermittently heating said column, mounting means, a lever pivotably mounted on said mounting means and movable by said column upon a change in said temperature spring means mounted on said mounting means, and toggle spring means mounted on said mounting means and engaging said lever, said toggle spring means opposing said spring means, said spring means being arranged to overcome said toggle means at a predetermined point in a change of volume of said column thereby to snap said lever to a first predetermined position, said toggle spring means being arranged to overcome said spring means at a predetermined point in an opposite change of volume of said column thereby to snap said lever to a second predetermined position.

3. A thermo-electric motor comprising a column of material expansible and contractable in response to variations in the temperature of said material, means for intermittently heating said column mounting means, a lever pivotably mounted on said mounting means and movable by said column upon a change in said temperature spring means mounted on said mounting means, means for adjusting the force of said spring means and toggle spring means mounted on said mounting means and engaging said lever, said toggle spring means opposing said spring means, spring means being arranged to overcome said toggle spring means at a predetermined point in an expansion of said column thereby to snap said lever to a first predetermined position, said toggle spring means being arranged to overcome said spring means at a predetermined point in a contraction of said column thereby to snap said lever to a second predetermined position.

4. A thermo-electric motor comprising a column of material expansible and contractable in response to variations in the temperature of said material, means adjacent said column for intermittently heating the same, mounting means, a lever pivotably mounted on said mounting means and movable by said column upon a change in said temperature, spring means mounted on said mounting means, and toggle spring means mounted on said mounting means and engaging said lever, said toggle spring means opposing said spring means, said spring means being arranged to overcome said toggle spring means at a predetermined point in an expansion of said column thereby to snap said lever to a first predetermined position, said toggle spring means being arranged to overcome said spring means at a predetermined point in a contraction of said column thereby to snap said lever to a second predetermined position.

5. A thermo-electric motor comprising support and pivot means, a lever pivotably mounted on said means, a spring mounted on said means and spaced from said lever, a column of material expansible and contractable in response to variations in the temperature of said material, means for intermittently heating said column, said column being arranged to bear against said lever at one end and to bear against said spring at the other end, and means engaging said lever and cooperating with said spring so as to cause said lever to snap to a first predetermined position during expansion of said column and to snap to a second predetermined position during contraction of said column.

6. A thermo-electric motor comprising a pivotably mounted lever, a column of material expansible and contractable in response to variations in the temperature of said material, means for intermittently heating said column, said lever being movable in response to changes in length of said column, and means engaging said lever and arranged to cause the same to snap to a first predetermined position in response to an expansion of said column and to cause said lever to snap to a second predetermined position in response to a contraction of said column, a rotatably mounted ratchet wheel, and means secured to said lever and arranged to engage a tooth of said ratchet wheel when said lever snaps to one of said predetermined positions thereby to rotate said wheel a predetermined amount.

7. A thermo-electric motor comprising support and pivot means, a lever pivotably mounted on said means, spring means pivotably mounted on said means and spaced from said lever, a column of material expansible in response to heat, electrically operable heating means adjacent said column for intermittently heating the same, said column being supported by and bearing against said spring at one end, and against said lever at the other end, toggle spring means engaging said lever and arranged to bias said lever against said column, said spring means being arranged to overcome said toggle spring means at a predetermined point in the expansion of said column thereby to snap said lever to a predetermined position, said toggle spring means being arranged to overcome said spring means at a predetermined point in the contraction of said column thereby to snap said lever to a second predetermined position, a pawl secured to said lever, and a ratchet wheel rotatably mounted in said support and pivot means, said pawl being arranged to engage a tooth of said ratchet wheel when said lever snaps to said second predetermined position thereby to rotate said ratchet wheel a predetermined amount.

8. A thermo-electric motor comprising support and pivot means, a lever pivotably mounted on said means intermediate its ends, a leaf spring member pivotably mounted on said means intermediate its ends, a column of material expansible in response to heat, said column being supported by and bearing against one end of said lever and one end of said spring, electrically operable heating means surrounding said column, contact means associated with said lever for controlling operation of said heating means, toggle spring means engaging the other end of said lever and arranged to bias said lever against said column, said spring being arranged to overcome said toggle spring means at a predetermined point in the expansion of said column thereby to snap said lever to a predetermined position, said toggle spring means being arranged to overcome said spring at a predetermined point in the contraction of said column thereby to snap said lever to a second predetermined position, a pawl secured to said lever, and a ratchet wheel rotatably mounted in said support and pivot means, said pawl being arranged to engage a tooth of said ratchet wheel when said lever snaps to said second predetermined position thereby to rotate said ratchet wheel a predetermined amount.

9. A thermo-electric motor comprising support and pivot means, a lever pivotably mounted on said means intermediate its ends, a leaf spring member pivotably mounted on said means intermediate its ends, a column of material expansible in response to heat, said column being supported between and bearing against one end of said lever and one end of said spring, a heating element adjacent said column, an electrical circuit for actuating said element, contact means movable with said lever to control completion of said circuit, stationary means engaging said spring and biasing the same against said column, toggle spring means engaging the other end of said lever and arranged to bias said lever against said column, said spring being arranged to overcome said spring toggle means at a predetermined point in the expansion of said column thereby to snap said lever to a predetermined position, said toggle spring means being arranged to overcome said spring at a predetermined point in the contraction of said column thereby to snap said lever to a second predetermined position, a pawl secured to said lever, and a ratchet wheel rotatably mounted in said support and pivot means, said pawl being arranged to engage a tooth of said ratchet wheel when said lever snaps to said first predetermined position thereby to rotate said ratchet wheel a predetermined amount.

10. A thermo-electric motor comprising support and pivot means, a lever pivotably mounted on said means intermediate its ends, a leaf spring member pivotably mounted on said means intermediate its ends, a column of material expansible in response to heat, said column being supported between and bearing against one end of said lever and one end of said leaf spring, a heating element adjacent said column, an electrical circuit for actuating said element, a pair of contacts controlling completion of said circuit, a member on said lever arranged to separate said contacts after a predetermined expansion of said column, stationary means engaging said leaf spring and biasing the same against said column, toggle spring means engaging the other end of said lever and arranged to bias said lever against said column, said leaf spring being arranged to overcome said toggle spring means at a predetermined point in the expansion of said column thereby to snap said lever to a second predetermined position whereby said contacts are reengaged to start actuation of said heating element, a pawl secured to said lever, and a ratchet wheel rotatably mounted in said support and pivot means, said pawl being arranged to engage a tooth of said ratchet wheel when said lever snaps to said second predetermined position thereby to rotate said ratchet wheel a predetermined amount, said pawl being arranged to move out of engagement with said ratchet when said lever snaps to said first predetermined position.

11. A thermo-electric motor comprising support and pivot means, a lever pivotably mounted on said means intermediate its ends, a leaf spring member pivotably mounted on said means intermediate its ends, a column of stainless steel expansible in response to heat, said column being supported between and bearing against one end of said lever and one end of said leaf spring, adjustable stationary means engaging said spring and biasing the same against said column, a heating coil wound around said column, an electrical circuit for actuating said coil, a pair of contacts controlling completion of said circuit, a member on said lever arranged to separate said contacts after a predetermined expansion of said column, a toggle spring member pivotably mounted between the other end of said lever and said support and pivot means, said leaf spring being arranged to overcome said toggle spring member at a predetermined point in the expansion of said column thereby to snap said lever to a predetermined position whereby said contacts are separated to stop actuation of said heating element, said toggle spring member being arranged to overcome said leaf spring at a predetermined point in the contraction of said column thereby to snap said lever to a second predetermined position whereby said contacts are reengaged to restart actuation of said heating coil, a pawl secured to said lever, and a ratchet wheel rotatably mounted in said support and pivot means, said pawl being arranged to engage a tooth of said ratchet wheel when said lever snaps to said second predetermined position thereby to rotate said ratchet wheel a predetermined amount, said pawl being arranged to move out of engagement with said ratchet wheel when said lever snaps to said first predetermined position, and leaf spring means secured to said support and pivot means, said leaf spring means engaging said ratchet wheel so as to prevent rotation of said wheel in a direction reverse to that occasioned by the engagement of said pawl with said ratchet wheel.

12. A thermo-electric motor comprising a pivotably mounted lever, a column of material expansible and contractable in response to variations in the temperature of said material, means for intermittently heating said column, said lever being movable in response to changes in volume of said column, and means engaging said lever and arranged to cause the same to move to a first predetermined position in response to an expansion of said column and to cause said lever to move to a second predetermined position in response to a contraction of said column, a rotatably mounted ratchet wheel, means secured to said lever and arranged to engage a tooth of said ratchet wheel when said lever moves to one of said predetermined positions thereby to rotate said wheel a predetermined amount, cam means secured to said wheel so as to rotate therewith, a cam follower arranged to be in engagement with said cam, and contact means controlled by said follower to determine the closing of an electrical circuit.

13. A thermo-electric motor comprising support and pivot means, a lever pivotably mounted on said means, spring means pivotably mounted on said means and spaced from said lever, a column of material expansible in response to heat, electrically operable heating means adjacent said column for intermittently heating the same, said column being supported by and bearing against said spring at one end, and against said lever at the other end, toggle spring means engaging said lever and arranged to bias said lever against said column, said spring means being arranged to overcome said toggle spring means at a predetermined point in the expansion of said column thereby to snap said lever to a predetermined position, said toggle spring means being arranged to overcome said spring means at a predetermined point in the contraction of said column thereby to snap said lever to a second predetermined position, a pawl secured to said lever, a ratchet wheel rotatably mounted in said support and pivot means, said pawl being arranged to engage a tooth of said ratchet wheel when said lever snaps to said second predetermined position thereby to rotate said ratchet wheel a predetermined amount, cam means secured to said wheel so as to rotate therewith, a cam follower arranged to be in engagement with said cam, and contact means controlled by said follower to determine the closing of an electrical circuit.

14. A thermo-electric motor comprising support and pivot means, a lever pivotably mounted on said means intermediate its end, a leaf spring member pivotably mounted on said means intermediate its ends, a column of material expansible in response to heat, said column being supported by and bearing against one end of said lever and one end of said leaf spring, electrically operable heating means surrounding said column, contact means associated with said lever for controlling operation of said heating means, toggle spring means secured to the other end of said lever and arranged to bias said lever against said column, said leaf spring being arranged to overcome said toggle spring means at a predetermined point in the expansion of said column thereby to snap said lever to a predetermined position, said toggle spring means being arranged to overcome said leaf spring at a predetermined point in the contraction of said column thereby to snap said lever to a second predetermined position, a pawl secured to said lever, a ratchet wheel rotatably mounted in said support and pivot means, said pawl being arranged to engage a tooth of said ratchet wheel when said lever snaps to said second predetermined position thereby to rotate said ratchet wheel a predetermined amount, an axial cam secured to said wheel so as to rotate therewith, an axial cam follower arranged to be in engagement with said cam, and contact means controlled by said follower to determine the closing of an electrical circuit.

15. A thermo-electric motor comprising support and pivot means, a lever pivotably mounted on said means intermediate its ends, a leaf spring member pivotably mounted on said means intermediate its ends, a column of material expansible in response to heat, said column being supported between and bearing against one end of said lever and one end of said leaf spring, a heating element adjacent said column, an electrical circuit for actuating said element, contact means movable with said lever to control completion of said circuit, stationary means engaging said leaf spring and biasing the same against said column, toggle spring means secured to the other end of said lever and arranged to bias said lever against said column, said leaf spring being arranged to overcome said toggle spring means at a predetermined point in the expansion of said column thereby to snap said lever to a predetermined position, said toggle spring means being arranged to overcome said leaf spring at a predetermined point in the contraction of said column thereby to snap said lever to a second predetermined position, a pawl secured to said lever, a ratchet wheel rotatably mounted in said support and pivot means, said pawl being arranged to engage a tooth of said ratchet wheel when said lever snaps to said second predetermined position thereby to rotate said ratchet wheel a predetermined amount, an axial cam secured to said wheel so as to rotate therewith, an insulating member secured to said support and pivot means, a flexible arm secured at one end to said insulating member, an axial cam follower formed on said arm and arranged to be in engagement with said cam thereby to determine the position of said arm, a movable contact formed on said arm, and a stationary contact secured to said insulating member, said movable contact and said stationary contact being arranged to engage at a predetermined position of said cam thereby to close an electrical circuit.

16. A thermo-electric motor comprising support and pivot means, a lever pivotably mounted on said means intermediate its ends, a leaf spring member pivotably mounted on said means intermediate its ends a column of stainless steel expansible in response to heat, said column being supported between and bearing against one end of said lever and one end of said leaf spring, adjustable stationary means engaging said leaf spring and biasing the same against said column, a heating coil wound around said column, an electrical circuit for actuating said coil, a pair of contacts controlling completion of said circuit, a member on said lever arranged to separate said contacts after a predetermined expansion of said column, a toggle spring member pivotably mounted between the other end of said lever and said support and pivot means, said leaf spring being arranged to overcome said toggle spring member at a predetermined point in the expansion of said column thereby to snap said lever to a predetermined position whereby said contacts are separated to stop actuation of said heating element, said toggle spring member being arranged to overcome said leaf spring at a predetermined point in the contraction of said column thereby to snap said lever to a second predetermined position whereby said contacts are reengaged to re-start actuation of said heating element, a pawl secured to said lever, a ratchet wheel rotatably mounted in said support and pivot means, said pawl being arranged to engage a tooth of said ratchet wheel when said lever snaps to said second predetermined position thereby to rotate said ratchet wheel a predetermined amount, said pawl being arranged to move out of engagement with said ratchet wheel when said lever snaps to said first predetermined position, leaf spring means secured to said support and pivot means, said leaf spring means engaging said ratchet wheel so as to prevent rotation of said wheel in a direction reverse to that occasioned by the engagement of said pawl with said ratchet wheel, an axial cam secured to said wheel so as to be rotatable therewith, said cam having a first group of radial slots formed near the periphery thereof and a second group of radial slots formed on a circle between said first group and the center of rotation of said cam, an insulating member secured to said support and pivot means, a pair of flexible arms secured respectively at one end to said insulating member, an axial cam follower formed on each of said arms, one of said followers being arranged to be engageable with said first group of slots and the other of said followers being arranged to be engageable with said second group of slots, movable contacts formed on said arms respectively, a pair of stationary contacts secured to said insulating member and engageable respectively with said movable contacts when said followers are engaged respectively in slots of said groups thereby to complete respectively a pair of electrical circuits.

References Cited in the file of this patent

UNITED STATES PATENTS

| | | |
|---|---|---|
| 2,435,907 | Schirokauer | Feb. 10, 1948 |
| 2,583,547 | Cox | Jan. 29, 1952 |
| 2,585,340 | Miller | Feb. 12, 1952 |